United States Patent
Lee et al.

(10) Patent No.: US 10,381,672 B2
(45) Date of Patent: Aug. 13, 2019

(54) REINFORCED COMPOSITE MEMBRANE FOR FUEL CELL AND MEMBRANE-ELECTRODE ASSEMBLY FOR FUEL CELL COMPRISING THE SAME

(71) Applicant: KOLON INDUSTRIES, INC., Gwacheon-si, Gyeonggi-do (KR)

(72) Inventors: Moo Seok Lee, Seoul (KR); Yong Cheol Shin, Seoul (KR); Na Young Kim, Yongin-si (KR); Eun Su Lee, Incheon (KR); Dong Hoon Lee, Goyang-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 19 days.

(21) Appl. No.: 14/646,470

(22) PCT Filed: Dec. 27, 2013

(86) PCT No.: PCT/KR2013/012260
§ 371 (c)(1),
(2) Date: May 21, 2015

(87) PCT Pub. No.: WO2014/104785
PCT Pub. Date: Jul. 3, 2014

(65) Prior Publication Data
US 2015/0303505 A1    Oct. 22, 2015

(30) Foreign Application Priority Data
Dec. 28, 2012 (KR) .......................... 10-2012-0155702

(51) Int. Cl.
*H01M 8/10* (2016.01)
*H01M 8/1044* (2016.01)
*H01M 8/1025* (2016.01)
*H01M 8/1058* (2016.01)
*H01M 8/106* (2016.01)
*H01M 8/1062* (2016.01)
*H01M 8/1069* (2016.01)
*H01M 4/88* (2006.01)
*H01M 8/1004* (2016.01)
*C08J 5/22* (2006.01)

(52) U.S. Cl.
CPC .......... *H01M 8/1044* (2013.01); *C08J 5/2206* (2013.01); *H01M 4/8825* (2013.01); *H01M 4/8875* (2013.01); *H01M 8/1004* (2013.01); *H01M 8/106* (2013.01); *H01M 8/1025* (2013.01); *H01M 8/1058* (2013.01); *H01M 8/1062* (2013.01); *H01M 8/1069* (2013.01); *H01M 2250/20* (2013.01); *H01M 2300/0082* (2013.01); *Y02E 60/521* (2013.01); *Y02P 70/56* (2015.11); *Y02T 90/32* (2013.01)

(58) Field of Classification Search
CPC ............. H01M 8/1044; H01M 8/8825; H01M 8/8875; H01M 8/1004; H01M 8/1025; H01M 8/1058; H01M 8/106; H01M 8/1062; H01M 8/1069; H01M 2250/20; H01M 2300/0082; C08J 5/2206; Y02E 60/521
See application file for complete search history.

(56) References Cited

U.S. PATENT DOCUMENTS

| 8,257,825 B2 | 9/2012 | Kim et al. | |
|---|---|---|---|
| 2004/0115489 A1* | 6/2004 | Goel | H01M 8/04119 429/413 |
| 2007/0122662 A1 | 5/2007 | Budinski et al. | |
| 2008/0182153 A1 | 7/2008 | Jang et al. | |
| 2011/0033776 A1* | 2/2011 | Fuchs | C08G 73/0694 429/492 |
| 2014/0051316 A1* | 2/2014 | Zhang | D04H 1/74 442/401 |
| 2016/0260995 A1* | 9/2016 | Lee | H01M 8/1018 |

FOREIGN PATENT DOCUMENTS

| KR | 10-2011-0129104 A | 12/2011 | |
|---|---|---|---|
| WO | 2011/025259 A2 | 3/2011 | |
| WO | 2011/149732 A2 | 12/2011 | |
| WO | WO 2011/149732 * | 12/2011 | .............. H01M 8/10 |
| WO | 2012/099582 A1 | 7/2012 | |
| WO | 2012/174463 A1 | 12/2012 | |

OTHER PUBLICATIONS

International Searching Authority International Search Report for PCT/KR2013/012260 dated Apr. 3, 2014.
Chinese Patent Office, communication dated Jun. 30, 2017 by the Chinese Patent Office in Chinese Application No. 201380067604.1.
Korean Intellectual Property Office; Communication dated Apr. 10, 2018 in Korean Patent Application No. 10-2012-0155702.

* cited by examiner

*Primary Examiner* — Raymond Alejandro
(74) *Attorney, Agent, or Firm* — Sughrue Mion, PLLC

(57) ABSTRACT

Disclosed are a reinforced composite membrane for fuel cells including a porous support comprising three-dimensionally irregularly and discontinuously arranged nanofibers of a polymer and a first ionic conductor, and a second ionic conductor filling pores of the porous support, wherein the first ionic conductor is present as nanofibers in the porous support or is present in the nanofibers of the polymer to form the nanofibers together with the polymer, and a membrane-electrode assembly for fuel cells including the same. As a result, impregnation uniformity and impregnation rate of the ionic conductors are improved and proton (hydrogen ion) conductivity is thus enhanced.

7 Claims, 1 Drawing Sheet

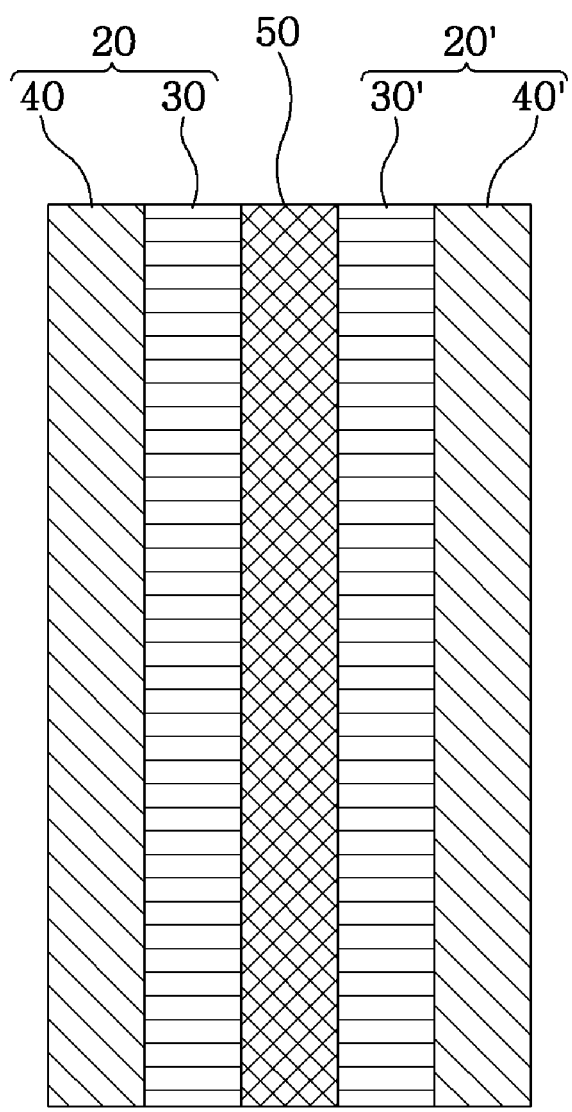

REINFORCED COMPOSITE MEMBRANE FOR FUEL CELL AND MEMBRANE-ELECTRODE ASSEMBLY FOR FUEL CELL COMPRISING THE SAME

CROSS REFERENCE TO RELATED APPLICATIONS

This application is a National Stage of International Application No. PCT/KR2013/012260 filed Dec. 27, 2013, claiming priority based on Korean Patent Application No. 10-2012-0155702 filed Dec. 28, 2012, the contents of all of which are incorporated herein by reference in their entirety.

BACKGROUND OF THE INVENTION

Field of the Invention

The present invention relates to a reinforced composite membrane for fuel cells and a membrane-electrode assembly for fuel cells comprising the same which exhibit improved proton (hydrogen ion) conductivity owing to increase in impregnation uniformity and impregnation rate of an ionic conductor.

Description of the Related Art

A fuel cell is a battery which directly converts chemical energy generated by oxidization of fuels into electrical energy and attracts much attention as a next-generation energy source due to high energy efficiency and eco-friendliness associated with less contaminant discharge. Such a fuel cell generally has a structure in which an electrolyte membrane is disposed between an anode and a cathode.

Representative examples of fuel cells for vehicles include proton exchange fuel cells which employ protons (hydrogen gas) as a fuel. The electrolyte membrane used for the proton exchange fuel cell should basically have superior proton conductivity because it serves as a passage enabling hydrogen ions (protons) generated in an anode to be transported to a cathode. In addition, the electrolyte membrane should satisfy requirements such as superior capability to separate hydrogen gas supplied to the anode and oxygen supplied to the cathode, and excellent mechanical strength, mechanical strength, shape stability, chemical resistance and the like, and less resistance loss at high current density. In particular, fuel cells for vehicles should have superior heat resistance so as to prevent the electrolyte membrane from being broken, when used at a high temperature for a long period of time.

As a commonly used electrolyte membrane for fuel cells, there is a perfluorosulfonic acid resin which is a fluorine-based resin (Nafion® (hereinafter, referred to as a "Nafion resin"). However, the Nafion resin has problems of low mechanical strength, generation of pin holes when used for a long time and thus decreased energy conversion efficiency. In an attempt to reinforce mechanical strength, a Nafion resin with an increased membrane thickness has been used. In this case, problems such as increased resistance loss and decreased economic efficiency caused by use of expensive materials occur.

A reinforced composite membrane was suggested in order to solve these problems and remedy drawbacks of conventional electrolyte membrane. The reinforced composite membrane includes an ionic conductor as an electrolyte substance and a porous support to remedy drawbacks of single electrolyte membranes, such as dimensional stability, durability and mechanical strength. A representative product including reinforced composite membrane is PRIMER® (produced by GORE-TEX Inc.). The reinforced composite membrane improves mechanical strength by combining a porous polytetrafluoroethylene resin with a fluorine-based ionic conductor. However, use of the fluorine-based ionic conductor and the fluorine-based porous support disadvantageously entails low competitiveness in need of price reduction in order to commercialize fuel cells.

Accordingly, low-cost hydrocarbon-based ionic conductors as substitutes for high-cost fluorine-based ionic conductors were developed, but the hydrocarbon-based ionic conductors are disadvantageously unsuitable for application to fluorine-based porous supports.

Accordingly, hydrocarbon-based porous supports suitable for hydrocarbon-based ionic conductors and more specifically, porous supports which may be used as composites with fluorine-based ionic conductors, as well as the hydrocarbon-based ionic conductors, are required. Furthermore, a reinforced composite membrane is used for fuel cells as a membrane-electrode assembly in which electrodes are bonded to both surfaces of the reinforced composite membrane having superior dimensional stability. Accordingly, a reinforced composite membrane having excellent dimensional stability is needed in order to prevent deterioration in performance and durability of fuel cells caused by contact defects on the interface between the electrodes and the reinforced composite membrane.

RELATED ART

Patent Document (Patent Document 1) Korean Patent Laid-open No. 2011-0084849 (published on Jul. 26, 2011)
(Patent Document 2) Korean Patent Laid-open No. 2011-0120185 (published on Nov. 3, 2011)

SUMMARY OF THE INVENTION

Therefore, the present invention has been made in view of the above problems, and it is one object of the present invention to provide a reinforced composite membrane for fuel cells that exhibits improved proton (hydrogen ion) conductivity owing to increase in impregnation uniformity and impregnation rate of an ionic conductor.

It is another object of the present invention to provide a membrane-electrode assembly for fuel cells which includes the reinforced composite membrane to improve performance of the fuel cell and a fuel cell including the membrane-electrode assembly.

In accordance with the present invention, the above and other objects can be accomplished by the provision of a reinforced composite membrane for fuel cells including a porous support including three-dimensionally irregularly and discontinuously arranged nanofibers of a polymer and a first ionic conductor, and a second ionic conductor filling pores of the porous support, wherein the first ionic conductor is present as nanofibers in the porous support or is present in the nanofibers of the polymer to form the nanofibers together with the polymer.

The first ionic conductor may be a hydrocarbon-based polymer having an ion exchange capacity of 2.5 mmol/g.

The first ionic conductor may be selected from the group consisting of sulfonated polyaryleneethersulfone, sulfonated polyetheretherketone, sulfonated polysulfone, sulfonated butadiene styrene and mixtures thereof.

The first ionic conductor may be the same as the second ionic conductor.

The first ionic conductor may be present in an amount of 5 to 50% by weight, with respect to the total weight of the porous support.

The porous support may contain a hydrocarbon-based polymer insoluble in an organic solvent.

The porous support may contain polyimide.

The porous support may have a porosity of 50 to 90%.

The second ionic conductor may be a hydrocarbon-based polymer soluble in an organic solvent.

The second ionic conductor may be selected from the group consisting of sulfonated polyimide, sulfonated polyarylethersulfone, sulfonated polyetheretherketone, sulfonated polybenzimidazole, sulfonated polysulfone, sulfonated polystyrene, sulfonated polyphosphazene and mixtures thereof.

The second ionic conductor may be present in an amount of 50% by weight to 99% by weight, with respect to the total weight of the reinforced composite membrane.

In accordance with another aspect of the present invention, there is provided a method for manufacturing a reinforced composite membrane for fuel cells including electrospinning a composition for electrospinning containing a precursor of a porous support-forming polymer and a first ionic conductor to produce a nanofiber web, or simultaneously electrospinning a composition for electrospinning comprising a precursor of a porous support-forming polymer and a composition for electrospinning comprising a first ionic conductor through separate spinning nozzles to produce a nanofiber web, and chemically curing the nanofiber web to produce a porous support, and filling pores present in the porous support with a second ionic conductor.

The first ionic conductor may be a hydrocarbon-based polymer having an ion exchange capacity of 2.5 mmol/g.

The porous support-forming polymer may be a hydrocarbon-based polymer insoluble in an organic solvent.

The chemical curing may be carried out using a curing gent selected from the group consisting of acetic dianhydride, pyridine, triethylamine, toluenesulfonic acid, hydroxybenzyl alcohol, aminophenol, hydroxybenzaldehyde, aminobenzoic acid and mixtures thereof.

The electrospinning may be carried out by applying an electric field of 850 V/cm to 3,500 V/cm.

In accordance with another aspect of the present invention, there is provided a membrane-electrode assembly for fuel cells including an anode and a cathode facing each other, and a polymer electrolyte membrane disposed between the anode and the cathode, wherein the polymer electrolyte membrane is the reinforced composite membrane.

In accordance with yet another aspect of the present invention, there is provided a fuel cell comprising the membrane-electrode assembly.

Details of other embodiments of the present invention are incorporated in the following detailed description of the present invention.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a sectional view schematically illustrating a membrane-electrode assembly according to an embodiment of the present invention.

DETAILED DESCRIPTION OF THE INVENTION

Hereinafter, embodiments of the present invention will be described in detail. These embodiments are provided only as examples and should not be construed as limiting the scope and spirit of the present invention. The present invention is defined only by the scope of claims given later.

As used herein, the term "nano" means a nano-scale and covers a size of 1 μm or less.

As used herein, the term "diameter" means a length of a short axis passing through a center of a fiber and the term "length" means a length of a long axis passing through the center of the fiber.

A solution of an ionic conductor or the like is not uniformly impregnated in a support due to open pores and closed pores finely created in the support during manufacture of hydrocarbon-based reinforced composite membranes and dead pores present therein after completion of manufacture of the membranes disadvantageously inhibit performance of the membrane in a fuel cell stack.

In this regard, in the process of producing a hydrocarbon-based nano-web porous support, a mixture of a support precursor and an ionic conductor is spun, thereby improving an affinity of the porous support to an organic solvent and facilitating impregnation, increasing impregnation uniformity and impregnation rate of the ionic conductor, improving proton conductivity and, as a result, enhancing performance of fuel cells.

That is, the reinforced composite membrane for fuel cells in accordance with an embodiment of the present invention includes: a porous support including three-dimensionally irregularly and discontinuously arranged nanofibers of a polymer and a first ionic conductor; and a second ionic conductor filled in pores of the porous support, wherein the first ionic conductor is present as nanofibers in the porous support or is present in the nanofibers of the polymer to form the nanofibers together with the polymer.

The porous support improves mechanical strength of the reinforced composite membrane and inhibits volume expansion by moisture, thereby functioning to enhance dimensional stability. The porous support may be produced by electrospinning a solution containing a precursor of a porous support-forming polymer to prepare nanofibers of the polymer precursor and chemically curing the nanofibers. In the present embodiment, the porous support produced by electrospinning a mixture of the solution containing the precursor of a porous support-forming polymer and a first ionic conductor includes a web of three-dimensionally irregularly and discontinuously arranged polymer nanofibers and the polymer nanofibers constituting the web include an ionic conductor. The first ionic conductor included in the polymer nanofibers has similar effects to polymer nanofibers pre-coated with an ionic conductor. Alternatively, a solution containing a precursor of a porous support-forming polymer and a solution containing a first ionic conductor are separately prepared and are then simultaneously electrospun through respective spinning nozzles, thereby producing a porous support having a web structure in which nanofibers of the polymer are entangled with nanofibers of the first ionic conductor.

Any first ionic conductor may be used without particular limitation so long as it is generally used as a proton conductor for polymer electrolyte membranes. Specifically, a hydrocarbon-based polymer, which has superior proton conductivity, is advantageous in view of price and is soluble in an organic solvent, may be used as the first ionic conductor. Here, the expression "a substance is soluble in an organic solvent" means that the substance is dissolved in the organic solvent at room temperature.

Preferably, the first ionic conductor is a hydrocarbon-based polymer having an ion exchange capacity (IEC) of 2.5 mmol/g or more. The hydrocarbon-based polymer having a high ion exchange capacity of the range defined above reduces a content of ionic conductor in a polymer nanofiber-forming composition, thus preventing deterioration in strength and dimensional stability of the porous support caused by use of the first ionic conductor. Specifically, examples of the hydrocarbon-based polymer include sulfonated polyaryleneethersulfone, sulfonated polyetheretherketone (SPEEK), sulfonated polysulfone (S-PSU), sulfonated butadiene styrene and combinations thereof. More preferably, the first ionic conductor is the same as a second ionic conductor impregnated later in view of improvement in affinity between the porous support and the second ionic conductor.

The first ionic conductor may be present in an amount of 5 to 50% by weight with respect to the total weight of the porous support. When the content of the first ionic conductor is lower than 5% by weight, effects obtained by using the ionic conductor are insufficient and when the content exceeds 50% by weight, mechanical strength and dimensional stability of the porous support may be deteriorated.

The web of polymer nanofibers constituting the porous support is an assembly of three-dimensionally irregularly and discontinuously arranged nanofibers which are produced by electrospinning. Each polymer nanofiber preferably has a mean diameter of 40 to 5,000 nm, in consideration of porosity and thickness of the web, wherein the mean diameter is obtained by measuring diameters of 50 nanofibers with a scanning electron microscope (JSM6700F, JEOL) and calculating an average of the 50 diameters. When the mean diameter of the nanofibers is lower than 40 nm, mechanical strength of the reinforced composite membrane may be deteriorated and when the mean diameter of the nanofibers exceeds 5,000 nm, porosity may be decreased and thickness may be increased.

The porous support of the present invention has a porosity of 50% or more because it is formed by randomly arranging the nanofibers having a diameter within the range defined above. As the porous support has a porosity of 50% or more, specific surface area of the porous support increases, thus facilitating impregnation of the ionic conductor and providing superior ion conductivity. Meanwhile, the porous support preferably has a porosity of 98% or less. When the porosity of the porous support exceeds 98%, subsequent processes may not be efficiently performed due to deterioration in shape stability. The porosity may be calculated as a ratio of an air volume with respect to a total volume of the porous support in accordance with the following Equation 1. The total volume is calculated by producing a rectangular porous support sample and measuring width, length and thickness of the sample and the air volume is obtained by measuring a weight of the sample and subtracting a polymer volume, calculated back from polymer density, from the total volume.

Porosity (%)=air volume in porous support/total volume of porous support×100    Equation 1

In addition, the porous support may have a mean thickness of 5 to 40 μm. When the thickness of the porous support is smaller than 5 μm, mechanical strength and dimensional stability of the reinforced composite membrane may be deteriorated and, on the other hand, when the thickness exceeds 40 μm, resistance loss may increase upon application to the reinforced composite membrane and weight reduction and integration may be deteriorated. Preferably, the porous support may have a mean thickness of 10 to 30 μm.

Preferably, the porous support comprises a hydrocarbon-based polymer which exhibits superior chemical resistance due to insolubility in common organic solvents, facilitates filling of the ionic conductor in pores of the porous support and is free of shape variation by moisture in high-humidity environments due to hydrophobicity. The hydrocarbon-based polymer may be selected from nylon, polyimide (PI), polybenzoxazole (PBO), polybenzimidazole (PBI), polyamideimide (PAI), polyethylene terephthalate, polyethylene (PE), polypropylene, (PP), copolymers thereof and mixtures thereof. Of these, a polyimide polymer having superior heat resistance, chemical resistance and shape stability is preferred.

When the porous support comprises polyimide, the porous support preferably has an imidization degree of 90% or more. The imidization degree refers to a degree of a precursor of polyimide which is converted into imide groups upon cyclization through an imidization process. The imidization degree is calculated in accordance with the following Equation 2.

Imidization degree (%)=weight of porous support after solvent treatment/weight of porous support before solvent treatment×100    Equation 2

The weight of porous support before solvent treatment is measured using a porous support stored in a vacuum chamber set to a temperature of 30° C. for 24 hours or longer and the weight of the porous support after solvent treatment is measured using a porous support obtained by immersing the porous support before solvent treatment in dimethylformamide as an organic solvent, stirring the porous support at room temperature for 24 hours, washing the porous support with distilled water five times, storing the washed porous support in a vacuum chamber set to a temperature of 30° C. for hours or longer again and then treating the porous support with a solvent.

When the imidization degree is lower than 90%, nanofibers constituting the porous support may be damaged by the organic solvent and it is thus difficult to maintain required physical properties for a long time. Accordingly, a polyimide porous support having an imidization degree of 90% or more after solvent treatment maintains high tensile strength and superior dissolution resistance to an electrolyte under strong acidic conditions which are operation environments of fuel cells, thus preventing interfacial de-adhesion between the porous support and the electrode and maintaining ion conductivity for a long time. In addition, the polyimide porous support having superior acid resistance when applied to electrolyte membranes for fuel cells that operate under strongly acidic environments exhibits superior performance and thus improved reliability.

The polymer constituting the porous support preferably has a weight average molecular weight of 30,000 to 500,000 g/mol so that the porous support exhibits superior porosity, contains nanofibers having an optimal diameter, has an optimal thickness, is easily produced and exhibits superior tensile strength after wet-treatment. When the weight average molecular weight of the polymer constituting the porous support is lower than 30,000 g/mol, the porosity and thickness of the porous support are easily controlled, but tensile strength after wet-treatment may be deteriorated. On the other hand, when the weight average molecular weight of the polymer constituting the porous support exceeds 500,000 g/mol, heat resistance may be slightly improved, but production process may not be efficiently performed and porosity may be deteriorated.

In addition, the porous support has a melting point of 400° C. or higher, preferably 400 to 800° C. because the porous support has the weight average molecular weight of the range defined above and the polymer precursor is converted into the polymer under optimum curing conditions. When the melting point of the porous support is lower than 400° C., the porous support may be readily deformed due to low heat resistance and performance of fuel cells produced using the porous support may thus be deteriorated. In addition, when the heat resistance of porous support is deteriorated, the porous support may be deformed by heat generation and performance of fuel cells may be deteriorated and, in serious cases, the fuel cells may be disadvantageously broken and explode.

The porous support is preferably present in an amount of 1 to 50% by weight with respect to the total weight of the reinforced composite membrane. When the content of the porous support is lower than 1% by weight, mechanical strength and dimensional stability of the reinforced composite membrane may be deteriorated and when the content of the porous support exceeds 50% by weight, proton conductivity of the reinforced composite membrane may be deteriorated.

The pores of the porous support are filled with a second ionic conductor.

The second ionic conductor performs hydrogen ion (proton) conduction which is a main function of polymer electrolyte membranes. A hydrocarbon-based polymer which exhibits superior proton conductivity and is advantageous in terms of cost may be used as the second ionic conductor. In particular, as described above, when taking into consideration ease of a process of filling the second ionic conductor in holes of the porous support, a hydrocarbon-based polymer soluble in an organic solvent is preferably used. Examples of the hydrocarbon-based polymer soluble in the organic solvent include sulfonated polyimide, (S-PI), sulfonated polyarylethersulfone (S-PAES), sulfonated polyetheretherketone (SPEEK), sulfonated polybenzimidazole, (SPBI), sulfonated polysulfone (S-PSU), sulfonated polystyrene (S-PS), sulfonated polyphosphazene and mixtures thereof, but the present invention is not limited thereto.

In general, adhesion between the second ionic conductor and the porous support may be deteriorated when operation conditions such as temperature or humidity change during operation of fuel cells. In the present invention, adhesion between the second ionic conductor and the porous support is excellent because both the second ionic conductor and the porous support are composed of a hydrocarbon-based polymer. Specifically, adhesion between the second ionic conductor and the porous support is considerably superior, when a sulfonated compound of a hydrocarbon-based compound contained in the porous support is used as a hydrocarbon-based compound contained in the second ionic conductor, for example, sulfonated polyimide (S-PI) is used as the second ionic conductor and polyimide (PI) is used as the porous support. As a result, hydrogen-oxygen separation capacity is excellent and price competitiveness is superior upon mass-production because a cheap hydrocarbon-based polymer substance is used rather than a conventional more expensive Nafion or Teflon resin.

The second ionic conductor may be present in an amount of 50 to 99% by weight, with respect to the total weight of the reinforced composite membrane. When the content of the ionic conductor is lower than 50% by weight, proton conductivity of the reinforced composite membrane may be deteriorated and when the content of the second ionic conductor exceeds 99% by weight, mechanical strength and dimensional stability of the reinforced composite membrane may be deteriorated.

The second ionic conductor may be formed to a thickness of 1 μm or more on a surface of the porous support according to manufacturing process. The thickness is preferably adjusted to 10 μm or less. When the second ionic conductor is formed to a thickness exceeding 10 μm on the surface of the porous support, mechanical strength of the reinforced composite membrane may be deteriorated, thus causing an increase in the total thickness of the reinforced composite membrane and increasing resistance loss.

The reinforced composite membrane according to the present invention comprises a first ionic conductor present in polymer nanofibers randomly arranged in the porous support or as separate nanofibers constituting the porous support, thereby improving affinity of the porous support to the organic solvent and the ionic conductor. In addition, the first ionic conductor serves as a passage enabling a solution containing the second ionic conductor in the subsequent process to effectively permeate into pores of the porous support, thus improving impregnation uniformity and impregnation rate of the second ionic conductor and thereby improving proton conductivity of the reinforced composite membrane.

In addition, in accordance with the reinforced composite membrane, curing of the precursor of the porous support-forming polymer in the production of the porous support may be carried out using chemical curing, thereby removing the risk of decomposition of the first ionic conductor contained in the polymer nanofibers or as separate nanofibers even after production of the porous support. Both the second ionic conductor contained in the pores of the porous support and the first ionic conductor contained in the porous support can be acidified through acid treatment after manufacture of the reinforced composite membrane, thereby further improving performance of fuel cells.

In addition, the reinforced composite membrane according to the present invention has a structure in which the second ionic conductor fills holes of the porous support and thus exhibits high mechanical strength of 25 MPa or more. As the mechanical strength increases, the total thickness of the reinforced composite membrane can be decreased to 40 μm or less and, as a result, material costs are reduced, proton conductivity is increased and resistance loss is decreased.

In addition, the reinforced composite membrane having the configuration exhibits superior dimensional stability when swollen in water, of 50% or less, preferably 20% or less. The dimensional stability is a physical property evaluated in accordance with the following Equation 3 using a length variation before and after swelling of the reinforced composite membrane in water when the reinforced composite membrane is swollen in water.

$$\text{Dimensional stability} = [(\text{length after swelling} - \text{length before swelling})/\text{length before swelling}] \times 100 \quad \text{Equation 3}$$

In another embodiment of the present invention, provided is a method for manufacturing a reinforced composite membrane for fuel cells including electrospinning a composition for electrospinning containing a precursor of a porous support-forming polymer and a first ionic conductor to produce a nanofiber web, or simultaneously electrospinning a composition for electrospinning containing a precursor of a porous support-forming polymer and a composition for electrospinning containing a first ionic conductor through separate spinning nozzles to produce a nanofiber web and then chemically curing the nanofiber web to produce a porous support (first step), and filling pores contained in the porous support with a second ionic conductor (second step).

Hereinafter, the respective steps will be described in detail. In the first step, the porous support is produced using the precursor of a porous support-forming polymer and the first ionic conductor.

Because the porous support comprises a hydrocarbon-based polymer insoluble in an organic solvent as the porous support-forming polymer, the porous support may be produced without dissolving in the organic solvent, or preparing a nanofiber precursor using a precursor of the porous support-forming polymer readily soluble in an organic solvent and then proceeding predetermined reactions. The precursor of the porous support-forming polymer may be suitably selected depending on the type of the porous support-forming polymer and the type of porous support-forming polymer has been described above.

For example, a porous support containing polyimide (PI) may be produced by imidization of poly(amic acid) (PAA). In addition, the poly(amic acid) may be prepared by an ordinary preparation method and specifically, may be prepared by mixing diamine with a solvent, adding dianhydride to the mixture and polymerizing the resulting mixture.

The dianhydride may be selected from the group consisting of pyromellitic dianhydride (PMDA), 3,3',4,4'-benzophenonetetracarboxylic dianhydride (BTDA), 4,4'-oxydiphthalic anhydride (ODPA), 3,4,3',4'-biphenyltetracarboxylic dianhydride (BPDA), and bis(3,4-dicarboxyphenyl)dimethylsilane dianhydride (SiDA) and mixtures thereof. In addition, the diamine may be selected from the group consisting of 4,4'-oxydianiline (ODA), p-phenylene diamine (p-PDA), o-phenylene diamine (o-PDA) and mixtures thereof. The solvent used for dissolving the poly(amic acid) may be selected from the group consisting of m-cresol, N-methyl-2-pyrrolidone (NMP), dimethylformamide (DMF), dimethylacetamide (DMAc), dimethylsulfoxide (DMSO), acetone, diethyl acetate, tetrahydrofuran (THF), chloroform, γ-butyrolactone and mixtures thereof.

The precursor of the porous support-forming polymer is preferably present in an amount of 5 to 20% by weight with respect to the composition for electrospinning. When the concentration of the composition for electrospinning is lower than 5% by weight, spinning is not effectively performed, fibers are not formed or fibers having a uniform diameter cannot be produced. When the concentration of the composition for electrospinning exceeds 20% by weight, ejection pressure is sharply increased, spinning is not performed or processability is deteriorated.

The first ionic conductor has been described above. A content of the first ionic conductor in the composition for electrospinning may be suitably determined in consideration of the content of the first ionic conductor in the finished porous support.

Next, the precursor of the porous support-forming polymer is mixed with the first ionic conductor to prepare a composition for electrospinning and the composition is electrospun to produce a nanofiber web, or a composition for electrospinning comprising a precursor of a porous support-forming polymer and a composition for electrospinning comprising a first ionic conductor are separately prepared and then simultaneously electrospun through separate spinning nozzles to produce a web of nanofibers in which nanofibers of the polymer precursor are entangled with nanofibers of the first ionic conductor.

The composition for electrospinning may be prepared by dissolving the precursor of a porous support-forming polymer or the first ionic conductor in an ordinary organic solvent such as N-methyl-2-pyrrolidone (NMPa), dimethyl formamide (DMF), dimethyl acetamide (DMAc), dimethyl sulfoxide (DMSO) or tetrahydrofuran (THF).

The electrospinning may be carried out in accordance with a common electrospinning process for producing nanofibers.

Specifically, a predetermined amount of the composition for electrospinning is supplied to a spinning portion using a metering pump in a solution tank storing the composition for electrospinning, the composition for electrospinning is ejected through a nozzle of the spinning portion and then scattered and at the same time, hardened and cured to form nanofibers of a polymer and additionally the hardened nanofibers are collected by a collector having a release film to produce a fiber assembly. At this time, an intensity of electric field applied between the spinning portion and the collector by a high-voltage generator is preferably 850 to 3,500 V/cm. When the intensity of electric field is lower than 850 V/cm, production of nanofibers with a uniform thickness may be difficult due to non-continuous ejection of the precursor solution and production of fiber assembly may be difficult due to inefficient collection of nanofibers formed after spinning by the collector. On the other hand, when the intensity of electric field exceeds 3,500 V/cm, nanofibers are not accurately mounted in the collector and thus a fiber assembly having a normal shape cannot be obtained.

Nanofibers having a uniform fiber diameter, preferably a mean diameter of 0.01 to 5 μm are produced by the electrospinning process and the nanofibers are randomly arranged to constitute a fiber assembly, that is, a web.

Next, the produced nanofiber web is chemically cured.

In general, curing of the precursor of the hydrocarbon-based polymer is carried out by thermal treatment. In this regard, the first ionic conductor may be decomposed by heat when the precursor is cured using thermal treatment, because the nanofiber web comprises the first ionic conductor. Accordingly, in accordance with the present invention, the nanofiber web obtained after electrospinning is impregnated with a curing agent to induce curing of the polymer precursor. The curing agent may be selected from acetic dianhydride, pyridine, triethylamine, toluenesulfonic acid, hydroxybenzyl alcohol, aminophenol, hydroxybenzaldehyde, aminobenzoic acid and the like. The curing agent that can be used in the present invention is not limited to the compounds described above and may be suitably selected according to type of the precursor of the porous support-forming polymer used for production of porous supports.

Through chemical curing using the curing agent, the ionic conductor can be maintained even after production of the porous support.

The content of the curing agent is suitably determined according to content of the polymer precursor in the composition for electrospinning.

During the curing process, curing to convert the polymer precursor into the porous support-forming polymer occurs. For example, in a case in which the nanofiber or fiber assembly is produced from a polyimide precursor during electrospinning, the polyimide precursor is converted into polyimide through imidization using chemical curing.

In the second step, pores contained in the porous support produced in the first step are filled with the second ionic conductor.

The filling of the second ionic conductor may be carried out by immersing the porous support in a second ionic conductor-containing solution prepared by dissolving the second ionic conductor in a solvent, but the present invention is not limited thereto. The filling may be carried out using a variety of methods well known in the art, such as spraying, screen-printing and doctor blade. The immersion may be performed one to five times at room temperature for 5 to 30 minutes.

The second ionic conductor-containing solution may be prepared by dissolving the second ionic conductor in an organic solvent. The organic solvent may be selected from N-methyl-2-pyrrolidone (NMP), dimethylformamide (DMF), dimethyl acetamide (DMA) and the like, but the present invention is not limited thereto.

The second ionic conductor may be selected from those described above.

Preferably, an amount of the second ionic conductor in the second ionic conductor-containing solution is suitably determined in consideration of content of the second ionic conductor in the reinforced composite membrane. Specifically, the second ionic conductor is present in an amount of 5 to 40% by weight in the second ionic conductor-containing solution. When the second ionic conductor is present in an amount lower than 5% by weight in the second ionic conductor-containing solution, the second ionic conductor is not sufficiently filled in the holes of the porous support and voids may be created between the holes, and when the content of the second ionic conductor exceeds 40% by weight, the second ionic conductor may not fill the holes of the porous support due to excessively high viscosity of the second ionic conductor-containing solution.

After filling of the second ionic conductor-containing solution, the organic solvent is removed from the second ionic conductor-containing solution and holes of the porous support are then filled with the second ionic conductor. Accordingly, the method for manufacturing the reinforced composite membrane according to the present invention may further include removing the organic solvent after filling the second ionic conductor and the removal of the organic solvent may be carried out by drying the second ionic conductor-containing solution in a vacuum oven at 60 to 150° C. for 2 to 15 hours.

The reinforced composite membrane manufactured by the method has superior proton conductivity and thus exhibits improved proton conductivity when used as a polymer electrolyte membrane in a membrane-electrode assembly for fuel cells.

Accordingly, in accordance with another embodiment of the present invention, provided are a membrane-electrode assembly for fuel cells comprising the reinforced composite membrane as a polymer electrolyte membrane and a fuel cell comprising the same.

Specifically, the membrane-electrode assembly includes an anode and a cathode which face each other, and the reinforced composite membrane as a polymer electrolyte membrane disposed between the anode and the cathode.

FIG. 1 is a sectional view schematically illustrating a membrane-electrode assembly according to an embodiment of the present invention. Referring to FIG. 1, the membrane-electrode assembly 100 according to the present embodiment includes a polymer electrolyte membrane 50 and electrodes 20 and 20' for fuel cells disposed respectively on both surfaces of the polymer electrolyte membrane 50. The electrodes 20 and 20' include electrode substrates 40 and 40' and catalyst layers 30 and 30' formed on surfaces of the electrode substrate, respectively, and may further include a microporous layer (not shown) containing fine conductive particles such as carbon powder or carbon black to facilitate substance diffusion between the electrode substrates 40 and 40' and the catalyst layers 30 and 30'.

In the membrane-electrode assembly 100, the electrode 20 which is disposed on one surface of the polymer electrolyte membrane 50 and produces hydrogen ions and electrons from a fuel which is transported via the electrode substrate 40 to the catalyst layer 30 is referred to as an anode (or cathode) and the electrode which is disposed on the other surface of the polymer electrolyte membrane 50 and induces a reduction reaction to produce water from hydrogen ions supplied through the polymer electrolyte membrane 50 and an oxidizing agent transporting via the electrode substrate 40' to the catalyst layer 30' is referred to as a cathode (or anode).

The catalyst layers 30 and 30' of the anode and cathode 20 and 20' comprise a catalyst. Any catalyst may be used so long as it participates in reactions of fuel cells and is commonly used as a catalyst for fuel cells. Specifically, the catalyst may be a platinum-based catalyst and examples of the platinum-based catalyst include platinum, ruthenium, osmium, platinum-ruthenium alloys, platinum-osmium alloys, platinum-palladium alloys and platinum-M alloys (wherein M represents at least one transition metal selected from the group consisting of Ga, Ti, V, Cr, Mn, Fe, Co, Ni, Cu, Zn, Sn, Mo, W and Rh). More specifically, the platinum-based catalyst may include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni and Pt/Ru/Sn/W. The catalyst may be used as a catalyst (black) alone, or may be supported by a carrier upon use. Examples of the carrier include carbon-based substances such as graphite, denka black, ketjen black, acetylene black, carbon nanotube, carbon nanofiber, carbon nanowire, carbon nanoball and activated carbon, and inorganic particulates such as alumina, silica, zirconia and titania.

In addition, the catalyst layers 30 and 30' further include a binder resin to improve adhesion between the catalyst layer and the polymer electrolyte membrane and carry hydrogen ions. The binder resin may be the same as the ionic conductor used for production of the reinforced composite membrane.

The electrode substrates 40 and 40' may be porous conductive substrates to facilitate supply of hydrogen or oxygen. Representative examples of the porous conductive substrates include carbon paper, carbon cloth, carbon felt and metal cloth (porous film composed of fibrous metal cloth or metal film formed on the surface of cloth formed of polymer fibers), but the present invention is not limited thereto. In addition, preferably, the electrode substrate may be subjected to waterproofing with a fluorine-based resin so as to prevent deterioration in diffusion efficiency of reactants by water generated during operation of fuel cells. Examples of the fluorine-based resin include polytetrafluoroethylene, polyvinylidene fluoride, polyhexafluoropropylene, polyperfluoroalkyl vinyl ether, polyperfluorosulfonyl fluoride alkoxyvinyl ether, fluorinated ethylene propylene, polychlorotrifluoroethylene and copolymers thereof.

The membrane-electrode assembly may be produced by a general method for manufacturing a membrane-electrode assembly for fuel cells except that the reinforced composite membrane is used as a polymer electrolyte membrane.

In accordance with another embodiment of the present invention, provided is a fuel cell including a membrane-electrode assembly including the reinforced composite membrane as a polymer electrolyte membrane.

Specifically, the fuel cell includes at least one electricity generator for generating electricity through oxidization reaction of a fuel and reduction reaction of an oxidizing agent, a fuel supply for supplying the fuel to the electricity generator, and an oxidizing agent supply for supplying the oxidizing agent such as oxygen or air to the electricity generator, wherein the electricity generator includes a membrane-electrode assembly and a separator for supplying the fuel and the oxidizing agent to both sides of the membrane-electrode assembly. The fuel used herein may be a gas or liquid hydrogen or hydrocarbon fuel and representative examples of the hydrocarbon fuel include methanol, ethanol, propanol, butanol or natural gas.

The separator, the fuel supply and the oxidizing agent supply are used for general fuel cells, except that the membrane-electrode assembly according to the embodiment of the present invention is used in the fuel cell and a detailed description thereof will thus be omitted.

Hereinafter, embodiments will be described in detail so that they can be easily implemented by those skilled in the art. The present invention may be embodied in many different forms and should not be construed as limited to the embodiments set forth herein.

Example 1

A poly(amic acid)/THF spinning solution having a concentration of 25 wt % was applied to a first spinning nozzle and a sulfonated polysulfone/THF spinning solution having a concentration of 5 wt % was applied to a second spinning nozzle and electrospinning was performed at an applied voltage of 30 KV to produce a poly(amic acid) porous support. Then, the poly(amic acid) porous support was immersed in a solution consisting of pyridine and triethylamine mixed at a ratio of 2:1 to induce imidization, thereby producing a porous support having a mean thickness of 15 µm, insoluble in organic solvents.

The produced porous support was coated twice with a 20% ionic conductor solution of sulfonated polyaryletherusulfone (S-PAES) as a second ionic conductor using a doctor blade. Then, the porous support was dried at 80° C. for one hour and in a vacuum oven for one hour to produce a reinforced composite membrane.

An electrode layer was formed on the reinforced composite membrane by a decal method to manufacture a membrane-electrode assembly. A catalyst layer of the electrode was formed by applying a composition for forming catalyst layers containing a Pt/C catalyst to a release film and drying the film. The catalyst layer-coated release film was placed on both surfaces of the reinforced composite membrane such that the catalyst layer faced the reinforced composite membrane and was transferred to both surfaces of the reinforced composite membrane by hot-pressing at a pressure of 5 kg/cm$^2$ and at a temperature of 100° C. Then, a gas diffusion layer (GDL) was bonded to both surfaces of the catalyst layer-bonded reinforced composite membrane to manufacture a membrane-electrode assembly. An amount of loaded catalyst was 0.5 mg/cm$^2$.

Example 2

A membrane-electrode assembly was manufactured in the same manner as Example 1, except that a support precursor produced by mixing a poly(amic acid)/THF spinning solution having a concentration of 25 wt % with a sulfonated polysulfone/THF spinning solution having a concentration of 5 wt % and spinning the resulting mixture in one nozzle was used.

Comparative Example 1

A membrane-electrode assembly was manufactured in the same manner as Example 1, except that the first ionic conductor was not used.

Test Example 1: Proton Conductivity of Reinforced Composite Membrane

Proton conductivity of membrane-electrode assemblies produced in Examples 1 and 2 and Comparative Example 1 were measured by a constant current four terminal method.

Specifically, the membrane-electrode assemblies were stabilized under conditions of a relative humidity of 50% and 100% humidity of immersion in distilled water at a temperature of 80° C. for 20 to 30 minutes, and alternating current potential difference generated in the center of the electrolyte membrane during application of a constant alternating current at both ends of the electrolyte membrane was measured to obtain proton conductivity. Results are shown in the following Table 1.

Test Example 2: Testing of Durability of Reinforced Composite Membrane Under Dry/Wet Conditions Physical durability of membrane-electrode assemblies manufactured in Examples 1 and 2 and Comparative Example 1 in cells were measured by dry/wet testing.

Humidity was controlled from 0% to 10% in a stack while maintaining a constant prospective voltage and the control was repeated, and a time until which voltage drop occurred due to creation of pinholes was measured. Results are shown in the following Table 1.

TABLE 1

| Items | Proton conductivity (S/cm) | Durability under dry/wet conditions (hr) |
| --- | --- | --- |
| Example 1 | 0.1650 | 230 |
| Example 2 | 0.1580 | 250 |
| Comparative Example 1 | 0.1251 | 270 |

As apparent from the above description, the present invention provides a reinforced composite membrane which exhibits improved proton conductivity, because a porous support is produced by electrospinning a mixture of a porous support-forming polymer and an ionic conductor, thereby improving an affinity of the porous support to an organic solvent and the ionic conductor, facilitating impregnation of the ionic conductor, and increasing impregnation uniformity and impregnation rate of the ionic conductor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A composite membrane for fuel cells comprising:
a porous support comprising three-dimensionally irregularly and discontinuously arranged nanofibers, the three-dimensionally irregularly and discontinuously arranged nanofibers including two different types of nanofibers comprising a first nanofiber and a second nanofiber, wherein the first nanofiber is made from a polymer selected from the group consisting of nylon, polyimide, polybenzoxazole, polybenzimidazole, polyamideimide, polyethylene terephthalate, polyethylene, polypropylene, copolymers thereof and mixtures thereof, and the second nanofiber is made from a first ionic conducting material; and
a second ionic conducting material filled in pores of the porous support,
wherein the first ionic conducting material is selected from the group consisting of sulfonated polyaryleneethersulfone, sulfonated polyetheretherketone, sulfonated polysulfone, sulfonated butadiene styrene and a mixture thereof,
wherein the second ionic conducting material is selected from the group consisting of sulfonated polyimide, sulfonated polyarylethersulfone, sulfonated polyetheretherketone, sulfonated polybenzimidazole, sulfonated polysulfone, sulfonated polystyrene, sulfonated polyphosphazene and a mixture thereof, and wherein the composite membrane is used as a polymer electrolyte membrane in a membrane-electrode assembly for fuel cells.

2. The composite membrane for fuel cells according to claim 1, wherein the first ionic conducting material is the same as the second ionic conducting material.

3. The composite membrane for fuel cells according to claim 1, wherein the first ionic conducting material is comprised in an amount of 5 to 50% by weight, with respect to the total weight of the porous support.

4. The composite membrane for fuel cells according to claim 1, wherein the porous support has a porosity of 50 to 90%.

5. The composite membrane for fuel cells according to claim 1, wherein the second ionic conducting material is comprised in an amount of 50% by weight to 99% by weight, with respect to the total weight of the composite membrane.

6. A membrane-electrode assembly for fuel cells comprising:
an anode and a cathode facing each other; and
a polymer electrolyte membrane disposed between the anode and the cathode,
wherein the polymer electrolyte membrane is the composite membrane according to claim 1.

7. A fuel cell comprising the membrane-electrode assembly according to claim 6.

* * * * *